Aug. 10, 1937.    F. M. CLARK ET AL    2,089,687
ELECTROLYTIC COMPOSITION
Filed Dec. 10, 1935
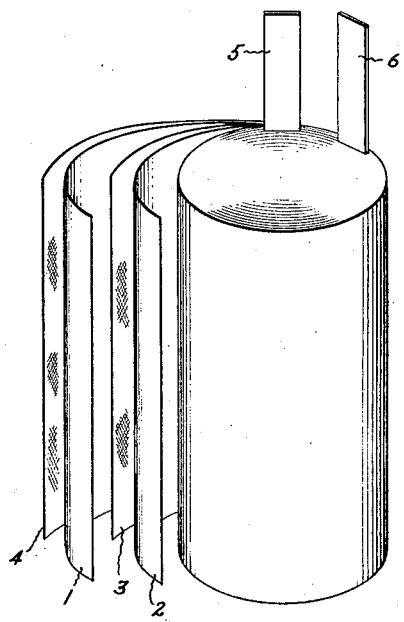
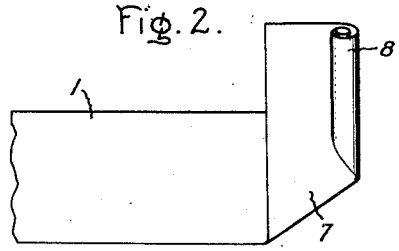
Inventors:
Frank M. Clark,
Ralph A. Ruscetta,
by Harry E. Dunham
Their Attorney.

Patented Aug. 10, 1937

2,089,687

UNITED STATES PATENT OFFICE 2,089,687

ELECTROLYTIC COMPOSITION

Frank M. Clark and Ralph A. Ruscetta, Pittsfield, Mass., assignors to General Electric Company, a corporation of New York Application December 10, 1935, Serial No. 53,752

11 Claims. (Cl. 175—315)

The present invention comprises an improved liquid electrolyte for electrolytic devices, such for example, as electric rectifiers and capacitors.

In U. S. Patent 2,022,500, issued Nov. 26, 1935, (application, Serial No. 4,665) to Clark and Koenig, and being assigned to the same assignee as the present application, various new electrolytic compositions are described, termed "cryohydric electrolytes", comprising mixtures of salts, which are liquid or semi-liquid at temperatures lower than the temperature of their lowest melting constituent.

The present invention comprises improved cryohydric electrolytes having greater stability or resistance to deterioration at elevated temperatures.

As described in said prior patent, one of the ingredients of a cryohydric electrolyte is an inorganic film-forming ionogen. It may consist of ammonium borate or phosphate. We have discovered that a cryohydric electrolyte is capable of better withstanding high temperatures if the amount in solution of such film-forming ionogen is increased and we have also discovered that the solubility of such compound in the electrolyte is greater in the presence of various combinations of electrolyte components as will be later described.

A cryohydric electrolyte consisting of a mixture of the tetraborate and acetate of ammonium may be made by neutralizing a mixture of boric and acetic acids with ammonia to a pH value of about 7 to 7.4. When the amount of boric acid is caused to exceed 3%, then apparently an excess of ammonium borate remains suspended in the electrolyte as a finely divided precipitate. In other words, a slight excess of boric acid over 3% leads to the formation of sufficient ammonium borate upon neutralization to result in cloudiness which progressively increases with the quantity of borate until finally with a sufficiently high percentage of borate a pasty mass is obtained instead of a liquid. Three per cent of boric acid in the acid mixture yields upon neutralization an electrolyte containing about 2.2 per cent of ammonium borate.

In accordance with our present invention, an improved electrolyte is obtained in which the amount of ammonium borate, or equivalent ionogen, in solution in the electrolyte is increased materially above about five per cent by weight and may be as high as 29%, or even higher. Capacitors containing such improved electrolyte can be operated successfully under ambient temperature conditions materially above 60° C. for protracted periods. Such high temperature stability renders devices, for example, capacitors, containing such electrolyte, suitable for industrial applications in which relatively high operating temperatures are incidental. Other advantageous physical characteristics of our improved electrolyte will appear hereinafter.

Electrolytes embodying our invention include various combinations of electrolytes of the ammonium compound type. One component in each case is a compound of a water-soluble aliphatic acid. Another component consists of either a compound of a water-soluble aliphatic acid or it consists of a water-soluble aromatic acid, such as carbolic or cresylic acids. This combination of components is liquid at ordinary temperatures.

Ordinarily the proportion by weight of the ammonium salt ionogen is in excess of five per cent but should not exceed about fifty per cent of the electrolyte.

The novel features of our invention will be set forth in greater detail in the appended claims.

The accompanying drawing Fig. 1 shows in perspective the assembled parts of an electric capacitor (exclusive of casing) for the impregnation of which the electrolyte of our invention is suitable, Fig. 2 illustrating a detail of terminal construction.

The following are examples of a number of three-component electrolyte mixtures which contain a high percentage of borate, and are clear, or non-turbid liquids, that is, substantially free from undissolved matter, and also have a suitable electric resistivity and other suitable physical characteristics.

A solution is prepared containing by weight about 36 per cent of boric acid, 32 per cent acetic acid and 32 per cent of lactic acid, the latter being a hydroxy aliphatic acid, having the formula $CH_3CHOHCOOH$. Ammonia gas is conducted into such solution of acids, thereby forming corresponding ammonium salts and water, the treatment with ammonia being continued until a slight alkaline reaction is obtained. For example, an alkalinity equal to not more than 2 per cent of ammonia is satisfactory.

An electrolyte so prepared has a viscosity of about 115 centipoise at 100° C. and 950 centipoise at 58°C. At room temperature it is a substantially clear liquid in which no ammonium borate or other component is present as a solid. The electrolyte mixture also at 25° C. has a marked stickiness or adhesiveness which is a desirable property in a liquid intended to impregnate and remain in a porous material.

At an impregnating temperature of 100° C. the electrolyte mixture is clear and fluid, the viscosity being reduced, namely to about 115 centipoises. Its resistivity at 25° C. is about 1000 to 1500 ohms per centimeter cube. At 90° C. the resistivity is about 50 to 75 ohms per centimeter cube.

The proportions of the ingredients above given may be varied within wide limits, without loss of the desirable characteristics although in the case of some proportions it may be necessary to employ an elevated impregnating temperature. The proportion of the boric acid component in general should not be much greater than fifty per cent of the acid mixture. The proportion of lactic acid component of said mixture should not be much less than about 20 per cent. For example, an electrolyte mixture of ammonium salts may be prepared by passing ammonia gas into a mixture by weight of 50 per cent boric acid, 25 per cent acetic acid and 25 per cent lactic acid. At 25° C. the liquid product is clear, transparent and sticky. When the amount of boric acid is increased to 60 per cent, the other two acids being each reduced to 20 per cent, then the product is slightly cloudy at 25° C. but is clear at higher temperatures. An ammonium salt mixture produced by passing ammonia gas into a mixture of 36 per cent boric acid, 43 per cent acetic acid and 21 per cent lactic acid is a clear, sticky liquid at 25° C. If the amount of lactic acid is reduced to 18 per cent in combination with 36 per cent boric acid and 46 per cent acetic acid, the mixture of salts produced on neutralization with ammonia is a clear, sticky, viscous liquid at 100° C. but shows some cloudiness at 25° C. If, however, the amount of lactic acid is reduced to 16 per cent, with an increase of acetic acid to 48 per cent, maintaining the boric at 36 per cent, then the resultant liquid product is cloudy and viscous at 25° C. Even at 100° C. a slight cloudiness persists indicative of undissolved ammonium borate. When the amount of boric acid in the acid mixture approximates 36 per cent, then the resulting ammonium borate content of the electrolyte is approximately 30 per cent.

In place of acetic acid other low molecular weight paraffin acids may be used in an electrolyte embodying our invention. For example, an electrolyte may be made as above described by introducing ammonia gas into an acid mixture consisting of 32 per cent lactic acid, 32 per cent propionic acid, and 36 per cent boric acid. The resultant liquid product is clear and somewhat viscous at 25° C. and still clear and more fluid at 100° C. Similarly, butyric acid may be substituted for acetic acid of the above formula and in the same proportion, the liquid product being slightly cloudy at 25° C. At 100° C. it is clear and amber colored. Acetic, propionic, butyric and lactic acids all contain less than five carbon atoms in the molecule.

It is also possible to prepare cryohydric electrolytes in which one of the components is an acid of the aromatic type such as carbolic acid or cresylic acid. As examples the following are given: If ammonia gas is introduced into a mixture of 36 per cent boric acid, 32 per cent lactic acid, and 32 per cent carbolic acid, the product obtained is free from solids at 25° C. and is a clear liquid at 100° C.

Likewise, the product might be obtained by similar neutralization of a mixture of 32 per cent carbolic acid, 36 per cent boric acid and 32 per cent acetic acid. While some crystals are present in the resulting product, both at 25° C. and at 100° C. a clear liquid component is produced which may be used for impregnation.

A more liquid product is obtained by employing cresylic acid as the aromatic acid component, an example being a product made from a mixture of 32 per cent acetic acid, 36 per cent boric acid and 32 per cent cresylic acid, the product being a clear liquid both at 25° C. and 100° C.

An electrolyte free from cloudiness at 100° C. may be made by employing together with boric acid, two aliphatic acids of the fatty acid series. For example, ammonium salts prepared from a mixture of 32 per cent acetic acid, 32 per cent butyric acid, and 36 per cent boric acid, while somewhat cloudy at 25° C. is clear liquid suitable for impregnation at 100° C. Likewise, a product made from 32 per cent acetic acid, 32 per cent propionic acid and 36 per cent boric acid, while a cloudy liquid at 25° C. is a clear liquid at 100° C.

An electrolyte prepared as above described is employed for the impregnation of capacitors, or the like, as described in the above Clark and Koenig application. The capacitor unit shown in the drawing comprises armatures 1, 2 which may consist of foil of aluminum, or other suitable metal of the film-forming type. The armatures should be preformed to produce a current blocking film thereon. One or more sheets of paper, fabric or other material capable of absorbing the electrolyte are interleaved with the armatures. The drawing shows two layers 3, 4 of such absorbent material. The armatures are provided with terminals 5, 6. As shown in Fig. 2, a terminal for an armature may be made by bending over at right angles one end of an armature strip 1 (as at 7) and rolling or folding it on itself, as indicated at 8. After assembly in the well-understood manner, the porous spacer is impregnated with an electrolyte embodying our invention, preferably at an elevated temperature and preferably under pressure. For example, the wound capacitor assembly may be impregnated with electrolyte made as above described by immersion at 100° C. for three hours using a superimposed gas pressure of about 100 lbs. Nitrogen or other inert gas may be used for this purpose.

When the assembly has been subjected to the electrolyte for about three hours at 100° C. it may be cooled to room temperature, preferably while under gas pressure. Although cooling to room temperature before removal from the electrolyte is not imperative, cooling should be carried at least to about 70° C. When the impregnation has been completed and the electrolyte has been cooled, capacitors are freed from excess electrolyte and assembled in an inert container as is well understood. In some cases the impregnated units may be subjected to a curing operation before being put into use. For A. C. voltage use, the impregnated capacitor is subjected to alternating current intermittently applied and/or to the application of direct current having its polarity reversed, at intervals of about 30 seconds.

While our invention has been described in connection with examples embodying a borate as an ionogen, other inorganic acid compounds, such as phosphates, may be employed in a similar way.

While our improved electrolyte has been illustrated with particular reference to the alternating current type of capacitor, it is of similar utility in capacitors designed for use in direct current circuits. For direct current application, the anode foil is preformed to produce a current-blocking film thereon. The construction of the capacitor is similar to the alternating current type described in that the the armatures are separated by paper, or other suitable absorbent spacer. After impregnation, the direct current type of capacitor may be subjected to a curing operation in which case a continuously applied unidirectional voltage at least as great as the rated D. C. voltage of the capacitor is used. In some cases, it may be desirable to cure the D. C. capacitor under D. C. voltage with an A. C. component equal to approximately 10 per cent of the D. C. voltage. The curing temperature may be at 25° C. but is preferably not greater than 60° to 70° C.

What we claim as new and desire to secure by Letters Patent of the United States, is:

1. A liquid electrolyte suitable for use with film-forming electrodes and containing at least five per cent by weight of a film-forming inorganic ionogen and a plurality of water-soluble organic acid compounds of ammonium at least one of which is a compound of an aliphatic acid.

2. A liquid electrolyte suitable for use with film-forming electrodes containing at least five per cent by weight of an ionogen consisting of a film-forming ammonium salt and a plurality of organic acid components, at least one of which is an ammonium salt of lactic acid.

3. A cryohydric electrolyte suitable for use with film-forming electrodes which is a clear liquid at a temperature at least as low as 100° C., said electrolyte containing in solution at least about five per cent by weight of a film-forming inorganic ionogen and a plurality of organic acid components, one of which is of the aliphatic class and another of which is of the aromatic class.

4. A cryohydric electrolyte suitable for use with film-forming electrodes which is a clear liquid at a temperature at least as low as 100° C., said electrolyte containing in solution at least about five per cent by weight of a film-forming inorganic ionogen and a plurality of organic acid components, one of which is an aliphatic acid and another of which is cresylic acid.

5. In an electrolytic device an impregnating composition consisting essentially of ammonium salts of boric acid, lactic acid, and acetic acid, the ammonium salt of boric acid being in excess of five per cent of the mixture.

6. In an electrolytic capacitor, an impregnating composition consisting essentially of the ammonium salts of boric, lactic, and acetic acid, the boric acid salt constituting about 30 per cent of said mixture.

7. A viscous, sticky electrolyte suitable for use in electrolytic capacitors comprising a mixture of a borate, an acetate and a lactate of ammonium, the proportion of borate component being less than about 50 per cent, and the proportion of lactate component being greater than about 20 per cent.

8. In an electric capacitor containing aluminum armatures an electrolyte consisting essentially of the ammonium salts of boric, lactic and acetic acids, said salts being in the proportion resulting by the neutralization with ammonia of an acid mixture containing by weight boric acid within a range of about 36 to 60 per cent, acetic acid within a range of about 32 to 20 per cent and lactic acid within a range of about 32 to 20 per cent.

9. In an electrolytic capacitor of the film-forming type an electrolyte containing more than five per cent by weight of a film-forming inorganic ionogen and a plurality of water-soluble, organic acid compounds of ammonium, at least one of which is a compound of an aliphatic acid containing less than five carbon atoms in the molecule.

10. In an electrolytic capacitor of the film-forming type an electrolyte containing more than five per cent by weight of ammonium borate and a plurality of ammonium compounds of water-soluble, organic acids, one of which is lactic acid.

11. In an electrolytic capacitor having film-forming electrodes, an impregnating composition consisting essentially of ammonium salts of boric acid, lactic acid and acetic acid, the ammonium salt of boric acid being in excess of five per cent of the mixture.

FRANK M. CLARK.
RALPH A. RUSCETTA.